UNITED STATES PATENT OFFICE.

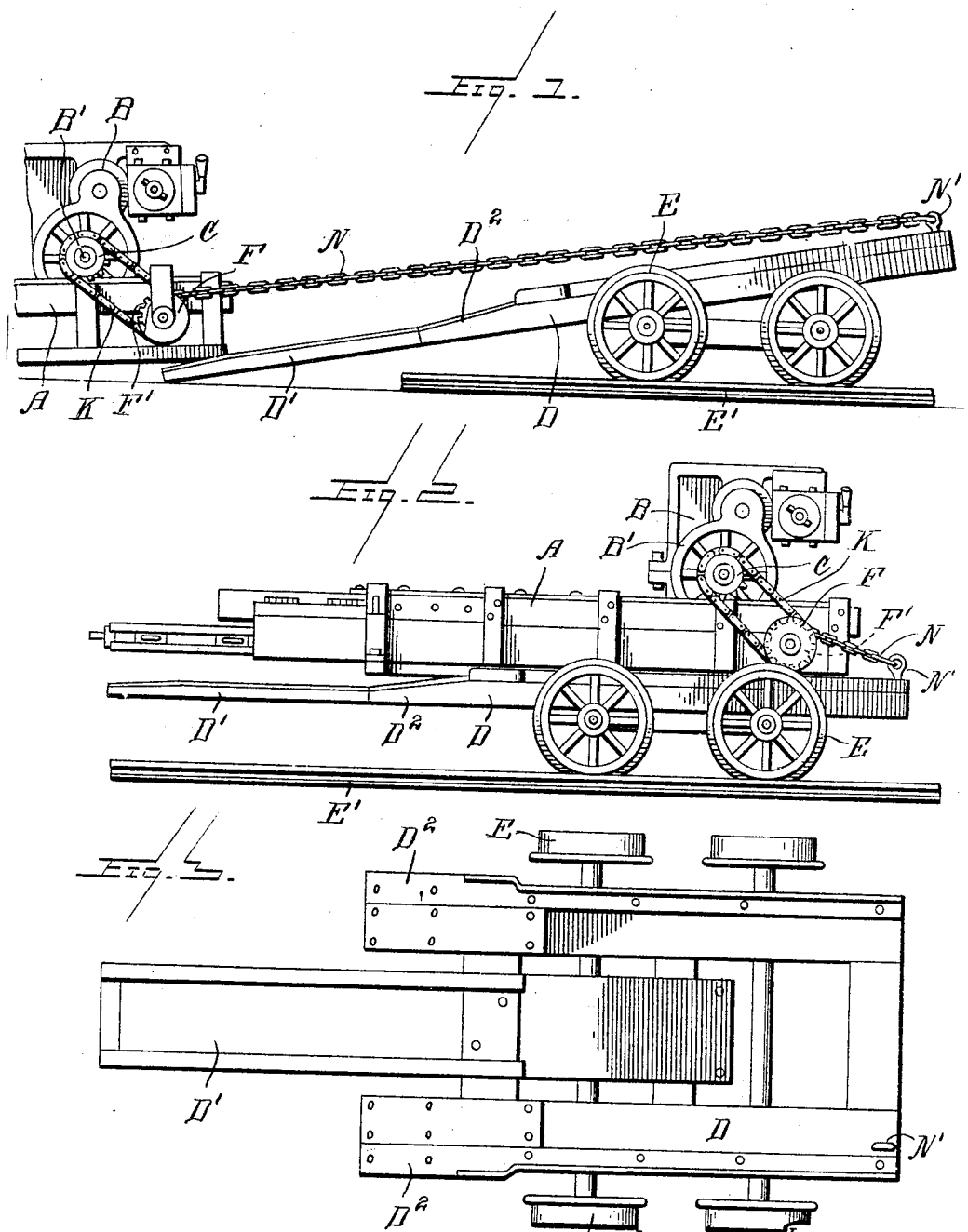

ANDREW HOLDREN, OF MISCO, OHIO.

DEVICE FOR LOADING MACHINES UPON TRUCKS.

No. 805,796.          Specification of Letters Patent.          Patented Nov. 28, 1905.

Application filed August 31, 1905. Serial No. 276,617.

*To all whom it may concern:*

Be it known that I, ANDREW HOLDREN, a citizen of the United States, residing at Misco, in the county of Perry and State of Ohio, have invented certain new and useful Improvements in Devices for Loading Machines upon Trucks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for loading machines upon trucks, and especially adapted for loading Jeffrey coal-mining machines upon trucks by electric power, and comprises in connection with a motor of the machine a winding drum or reel which is adapted to be thrown into gear with the motor, a loading-chain designed to wind about the reel and fastened at its other end to a truck, whereby as the forward end of the truck is tilted and the power applied the machine may be readily drawn upon the truck, thereby affording a convenient means for quickly loading the machine and transporting the same from one part of the mine to another.

The invention consists in various details of construction and in combinations and arrangements of parts, which will be hereinafter fully described and then specifically defined in the appended claims.

My invention is illustrated in the accompanying drawings, in which—

Figure 1 is a side elevation showing the machine about to be elevated upon the truck. Fig. 2 is a side elevation showing the machine loaded upon the truck, and Fig. 3 is a top plan view of the truck.

Reference now being had to the details of the drawings by letter, A designates a Jeffrey machine, which is of a type which is commonly employed in mining and is provided with a motor B with a shaft B', having a sprocket-wheel C fixed thereto.

D designates a truck mounted upon the wheels E and adapted to travel upon the track E', and one end of said truck has a central projecting portion D' and projecting inclined portions $D^2$, which are adapted to be tilted down to afford a means up which the frame of the machine may be drawn upon the truck.

F designates a winding reel or drum mounted in suitable bearings upon the frame of the machine and is provided with a sprocket-wheel F', about which and the sprocket-wheel C a chain K is passed. N designates a loading chain or cable, one end of which is fastened at N' to an eyebolt at the rear of the truck, and the other end of said chain or cable is adapted to be fastened to said reel or winding-drum, whereby as the current is turned on when the sprocket-chain is connected up, as shown, rotary movement may be imparted to said reel for the purpose of winding the loading-chain upon the latter.

In operation when it is desired to load the machine the forward end of the truck is tilted down, the wheels E are blocked, and the current turned on, causing the shaft B to impart a rotary movement to the winding-drum, which in turn will cause the loading-chain to wind about the latter, and as one end of the chain is anchored to the truck obviously the machine will be pulled upon the inclined projecting ends of the truck and the machine will be ready to be transported from place to place within a mine. In unloading the machine the sprocket-chain connection with the motor-shaft is removed or released from the motor-shaft by any suitable clutch mechanism, thereby allowing the reel or winding-drum to unwind as the machine passes down the truck as it is tilted up.

Having thus fully described my invention, what I claim as new, and desire to secure by Letters Patent, is—

1. An apparatus for loading Jeffrey machines upon trucks comprising, in combination with the motor of the machine, a winding reel or drum mounted in suitable bearings in the frame of the machine, sprocket chain and wheel connections between said winding-drum and motor, a truck, a loading-chain anchored to one end of the truck and its other end fastened to and adapted to wind upon said reel or winding-drum, whereby as the motor is actuated, the machine may be drawn upon the truck, as set forth.

2. In combination with a machine-frame and motor thereon, a winding-reel journaled in suitable bearings upon said frame, sprocket wheel and chain connections between said motor and reel, a truck having projecting ends which are adapted to be tilted down to allow means up which said machine may be drawn upon the truck, a loading-chain anchored to said truck at the end opposite its projecting portions and adapted to wind upon said reel, whereby as the motor is actuated, the machine may be drawn upon the truck, as set forth.

In testimony whereof I hereunto affix my signature in the presence of two witnesses.

ANDREW HOLDREN.

Witnesses:
JOHN FRIERDLINGHAUS,
K. C. DE LONG.